United States Patent
Ballard (10) Patent No.: US 6,909,570 B2
(45) Date of Patent: Jun. 21, 2005

(54) HARD DISK DRIVE STORAGE SYSTEM

(75) Inventor: Curtis C. Ballard, Eaton, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 10/303,415

(22) Filed: Nov. 25, 2002

(65) Prior Publication Data

US 2004/0100716 A1 May 27, 2004

(51) Int. Cl.$^7$ .............................................. G11B 19/02
(52) U.S. Cl. ........................................................ 360/69
(58) Field of Search ....................... 360/69, 71, 78.04, 360/98.04, 98.05, 98.06, 98.08, 99.09; 439/188; 711/114; 707/102

(56) References Cited

U.S. PATENT DOCUMENTS

| | | | |
|---|---|---|---|
| 4,453,188 A | * | 6/1984 | Johnson et al. .......... 360/78.04 |
| 5,041,924 A | | 8/1991 | Blackborow et al. |
| 5,235,474 A | * | 8/1993 | Searle ......................... 360/71 |
| 5,576,911 A | * | 11/1996 | Porter ..................... 360/98.06 |
| 6,305,959 B1 | * | 10/2001 | Baker et al. ................ 439/188 |
| 6,480,350 B1 | * | 11/2002 | Malone ........................ 360/69 |
| 6,711,580 B2 | * | 3/2004 | Dahman et al. ............ 707/102 |
| 6,754,768 B2 | * | 6/2004 | Dimitri et al. .............. 711/114 |

* cited by examiner

Primary Examiner—David Hudspeth
Assistant Examiner—Fred F. Tzeng (57) ABSTRACT

Hard disk drive storage system. One embodiment of the hard disk drive storage system comprises a library. At least one storage device and at least one connector are mounted in the library. At least one hard disk drive is receivable in the at least one storage device and alternately receivable adjacent the at least one connector. A picker assembly is movably mounted in the library, the picker assembly delivering the at least one hard disk drive between the at least one storage device and the at least one connector.

24 Claims, 7 Drawing Sheets

HARD DISK DRIVE STORAGE SYSTEM

FIELD OF THE INVENTION

The invention generally pertains to storage systems, and more specifically, to hard disk drive storage systems.

BACKGROUND OF THE INVENTION

Storage systems, or autochangers, are commonly used to store data cartridges at known locations and to retrieve the desired data cartridges so that data may be written to and/or read from the data cartridges. Accordingly, large volumes of computer-readable data can be stored on numerous data cartridges and accessed by one or more computers connected to the storage system (e.g., over a network).

Such storage systems may include one or more storage magazines and cartridge read/write devices. The storage magazines serve as a storage location for the data cartridges, and the read/write device(s) provide access to the data stored on the data cartridges. The storage system may also include a controller operatively associated with a picker assembly as well as a drive system for moving the picker assembly among the data cartridges stored in the storage system.

As an illustration, if the controller receives an instruction to access a certain data cartridge, the controller causes the drive system to move the picker assembly to the location of the desired data cartridge. Then, the picker assembly retrieves the data cartridge and delivers it to the read/write device. The picker assembly may also be operated to return the data cartridge to the storage magazine following the read/write operation.

Typical data cartridges have relatively slow access times. For example, once the data cartridge has been delivered to the read/write device, it may take another 4 to 6 minutes to position the read/write head before the read/write operation can begin. Hard disk drives have much faster access times. For example, positioning the read/write head provided with a typical hard disk drive may take only about 10 to 15 ms before the read/write operation can begin.

Until recently, hard disk drives have generally been more expensive than data cartridges. But recently, the cost of hard disk drives is approaching the cost of data cartridges, and therefore hard disk drives are becoming more common for mass storage solutions than they have been in the past. For example, hard disk drives are typically provided for RAID (i.e., random array of independent disks) storage systems.

The hard disk drives used in RAID storage systems are always connected, even when not in use. Hard disk drives provided in an "always-connected" system are subject to wear and tear (e.g., from heat) or even permanent damage or data loss (e.g., during a power surge). In addition, extensive cabling is required to link each of the hard disk drives in such a system.

SUMMARY OF THE INVENTION

One embodiment of a hard disk drive storage system, according to the present invention, comprises a library, at least one storage device mounted in the library, and at least one connector mounted in the library. At least one hard disk drive is receivable in the at least one storage device and alternately receivable adjacent the at least one connector. A picker assembly is movably mounted in the library, the picker assembly delivering the at least one hard disk drive between the at least one storage device and the at least one connector.

An embodiment of a method for accessing data from a plurality of hard disk drives in a storage system comprises storing the plurality of hard disk drives in the storage system, transporting one of the plurality of hard disk drives to a connector in the storage system, connecting the transported hard disk drive to the connector for a read/write operation, and disconnecting the connected hard disk drive from the connector following the read/write operation.

BRIEF DESCRIPTION OF THE DRAWINGS

Illustrative and presently preferred embodiments of the invention are shown in the drawings, in which.

DETAILED DESCRIPTION

A hard disk drive storage system 10 is shown and described herein according to embodiments of the invention as it may be used to store large volumes of computer-readable data on a number of hard disk drives 12. One or more users may link to the storage system 10 (FIG. 1) from a computer 15 (e.g., over a network, direct connection, etc.) via suitable control circuitry (e.g., controller 19). The hard disk drive storage system 10 may comprise a library 14 having a number of storage devices 16 (e.g., storage magazines) and at least one data-access device 18 mounted therein. The storage devices 16 and the data-access device 18 may be arranged in any suitable configuration, such as the generally U-shaped configuration shown in FIG. 1.

Figure 1:
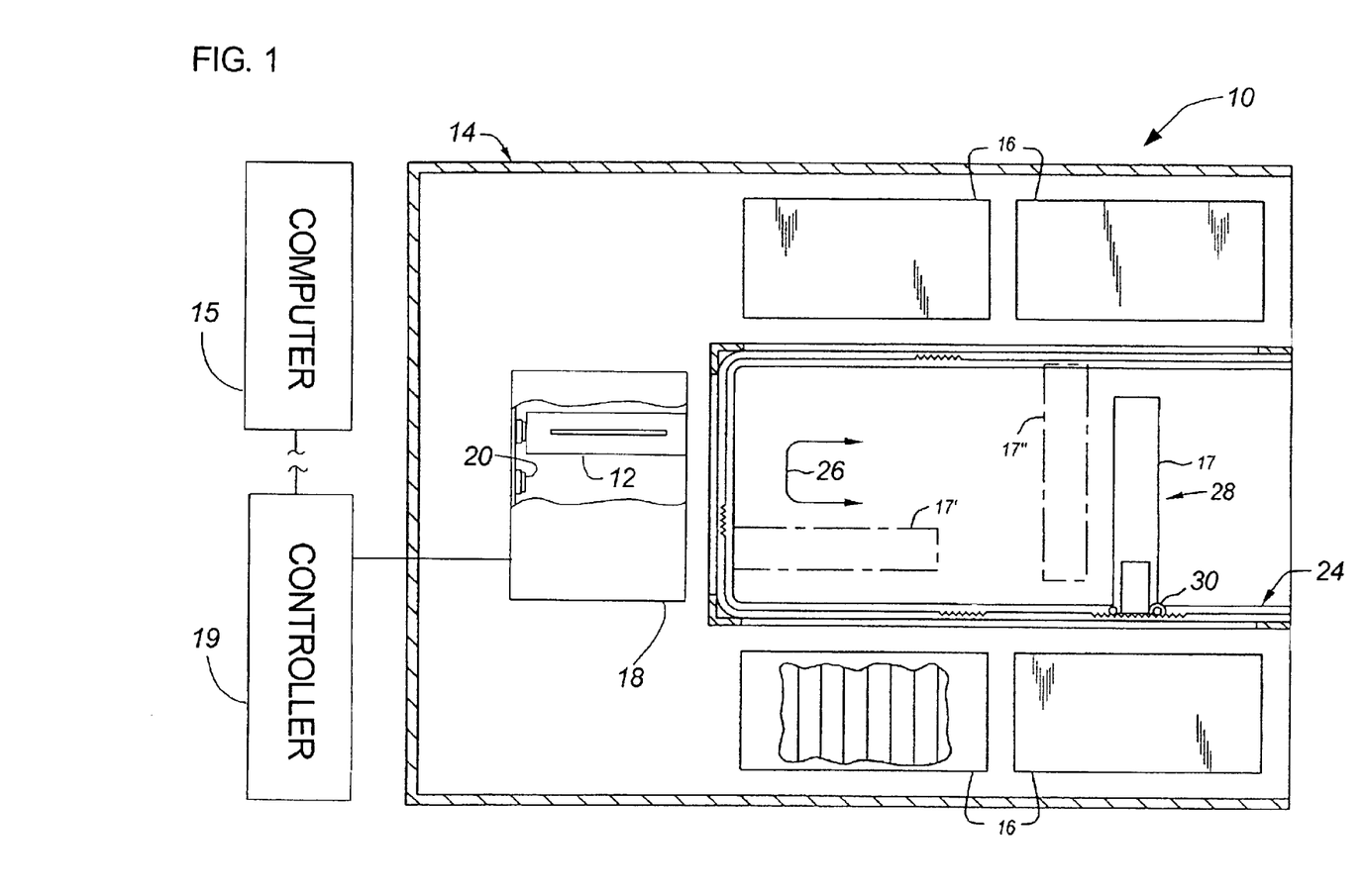
FIG. 1 is a plan view of one embodiment of a hard disk drive storage system.

It is noted that although the library 14 is shown with the storage devices 16 and the data-access device 18 arranged in a particular configuration in FIG. 1, other suitable configurations are also contemplated as being within the scope of the invention. In addition, the number of storage devices 16 and data-access devices 18 provided in the library 14 may depend upon various design considerations. Such considerations may include, but are not limited to, the frequency with which data is accessed. Other considerations may include the physical dimensions of the library 14.

The library 14 may also be provided with a picker assembly 28. Generally, the picker assembly 28 is adapted to engage one of the hard disk drives 12, to withdraw the hard disk drive 12 (e.g., from one of the storage devices 16), to transport the hard disk drive 12 with the library 14, and to eject the data cartridge 20 at the intended destination (e.g., the data-access device 18)

A guide system 24 may be mounted in the library 14 and defines a displacement path 26 adjacent the storage devices 16 and the data-access device 18. In one embodiment, the guide system 24 may comprise a rail, having a gear track mounted thereto. However, other embodiments of the guide system 24 are also contemplated as being within the scope of the invention and may be readily provided by one skilled in the art after having become familiar with the teachings of the present invention.

The picker assembly 28 is operatively associated with the guide system 24 and is movable along the displacement path 26 to access the hard disk drives 12 in the library 14. For example, the picker assembly 28 may comprise an actuator assembly 30 having a drive motor operatively associated with a gear assembly. The gear assembly may engage the gear track on the guide system 24 and move the picker assembly 28 on the guide system 24 in the library 14.

A suitable controller 19 is operatively associated with the picker assembly 28 to transport the hard disk drives 12 within the library 14, for example, between the data-access device 18 and the storage devices 16. For purposes of illustration, the picker assembly 28 is shown in positions 17, 17', and 17" in FIG. 1. The picker assembly 28 is shown positioned adjacent the storage devices 16 at positions 17 and 17", and is shown positioned adjacent the data-access device 18 at position 17'.

Figure 2:
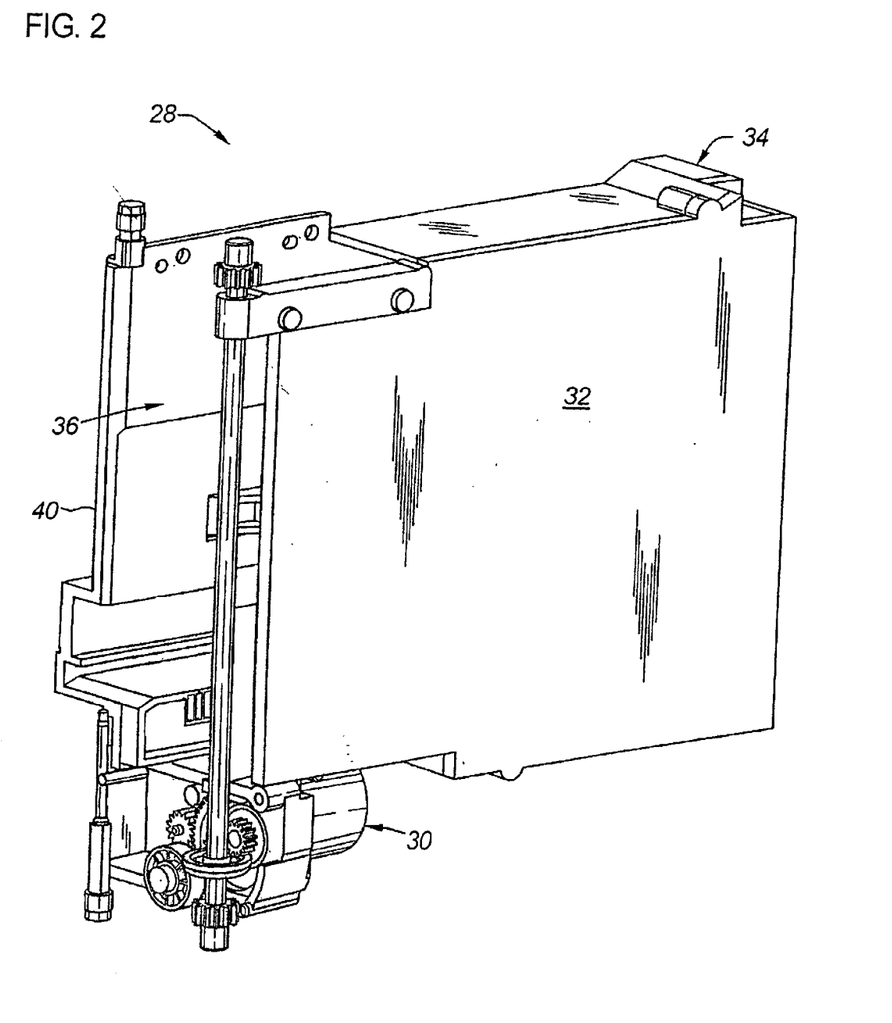
FIG. 2 is a perspective view of one embodiment of a picker assembly for use with the hard disk drive storage system shown in FIG. 1.
Figure 3:
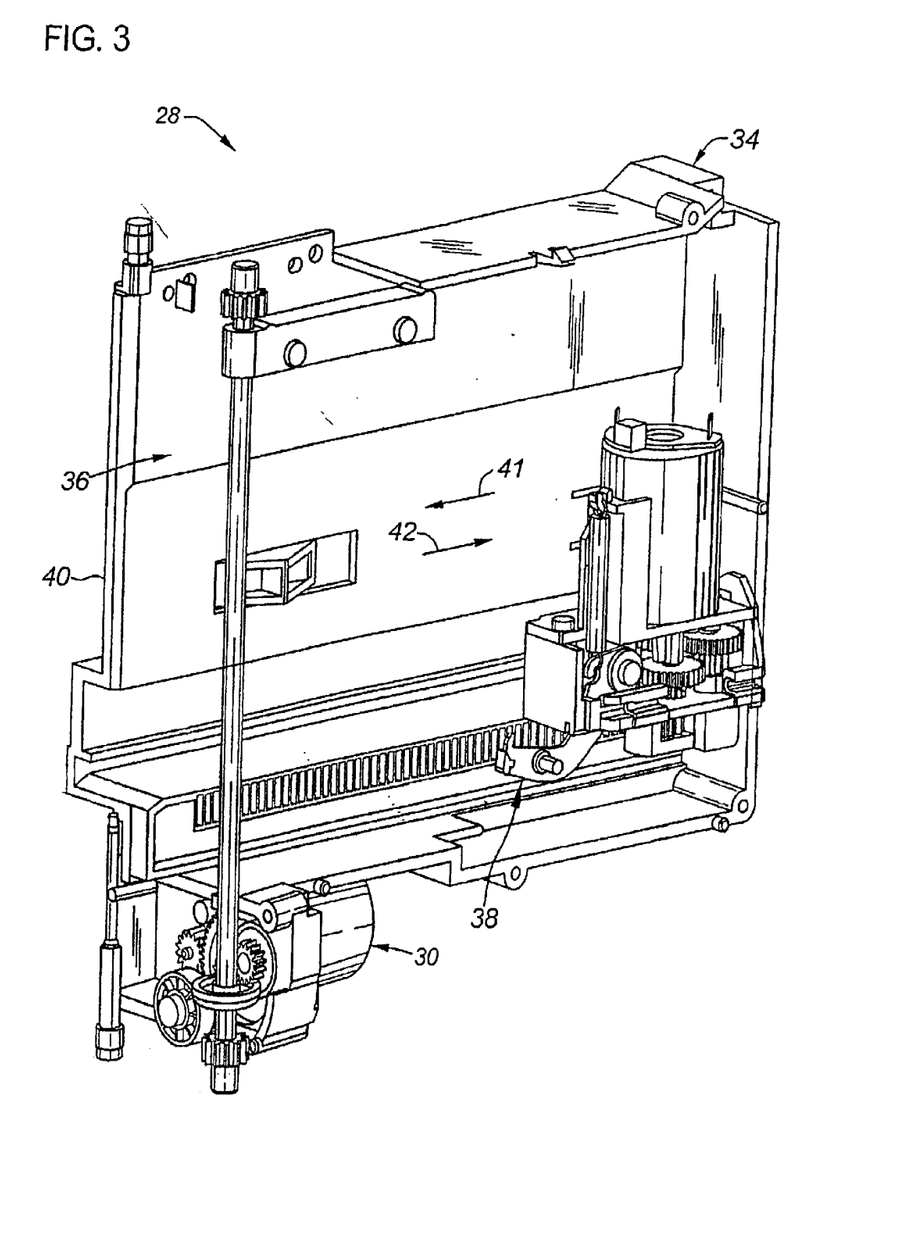
FIG. 3 is a perspective view of the picker assembly shown in FIG. 2 having a side member removed to show a plunge mechanism therein.

One embodiment of a picker assembly 28 that may be used according to the teachings of the invention is shown in more detail in FIG. 2, and is also shown in FIG. 3 with a side panel 32 removed therefrom. The picker assembly 28 may comprise a housing 34 that defines a cavity 36 sized to receive the hard disk drive 12. A plunge mechanism or "thumb assembly" 38 is slidably mounted to the housing 34 so that the thumb assembly 38 may be moved toward and away from the cartridge access end 40 of the housing 34, generally in the directions indicated by arrows 41 and 42, respectively.

It is noted that a wide range of other picker assemblies, now known or that may be developed in the future, are also contemplated as being within the scope of the invention. Consequently, the present invention should not be regarded as being limited to use with the particular picker assembly 28 shown and described herein.

Figure 4A:
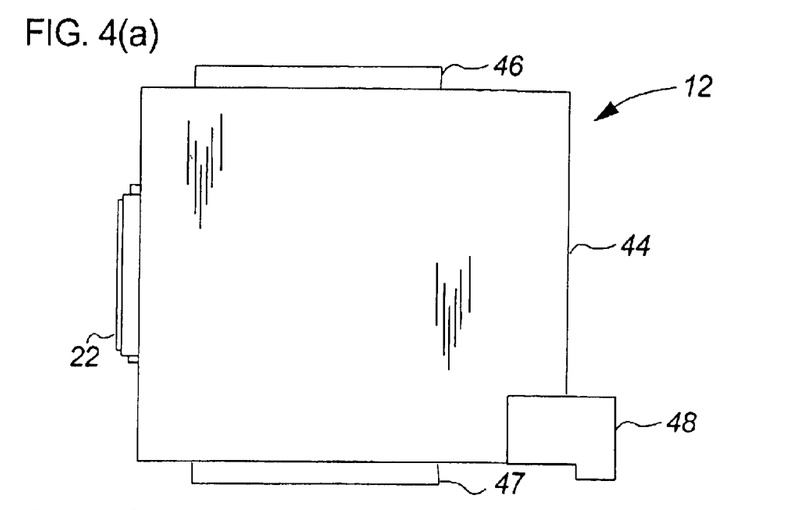
FIGS. 4(a) through 4(c) show (a) a side elevation view, (b) a plan view, and (c) a front elevation view of one embodiment of a hard disk drive, respectively.
Figure 4B:
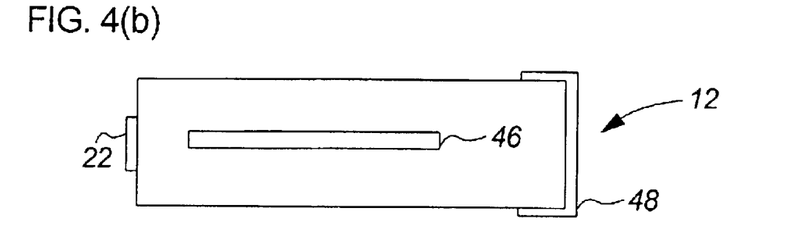
Figure 4C:
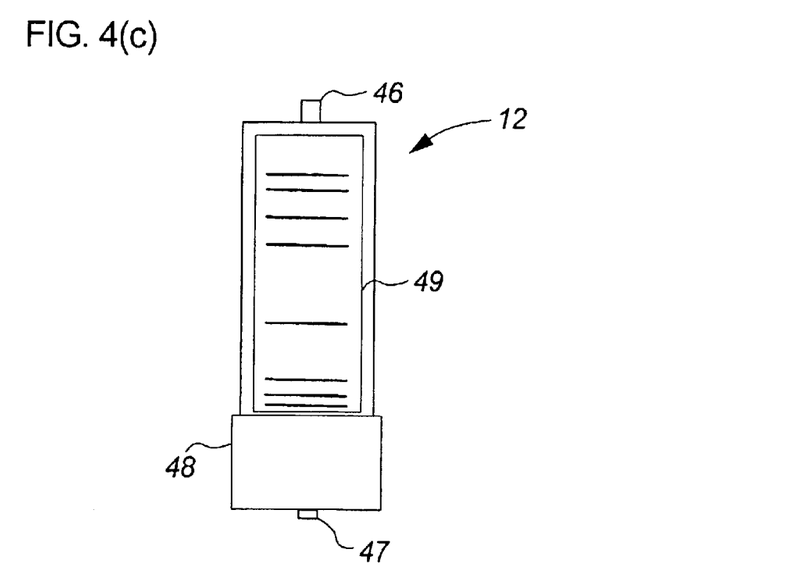

An embodiment of one of the hard disk drives 12 that may be provided for use with the hard disk drive storage system 10 of the present invention is shown in more detail in FIG. 4(a) through FIG. 4(c). The hard disk drive 12 may comprise a housing 44. One or more guide members 46, 47 may be mounted to or integrally formed with the housing 44 of the hard disk drive 12.

The guide members 46, 47 cooperate with mating storage device guides 52 (FIG. 5) that may be provided on the storage device 16 to align the hard disk drive 12 when it is being inserted and withdrawn therefrom. Accordingly, the hard disk drive 12 may be readily inserted in and withdrawn from the storage device 16 without binding.

Figure 5:
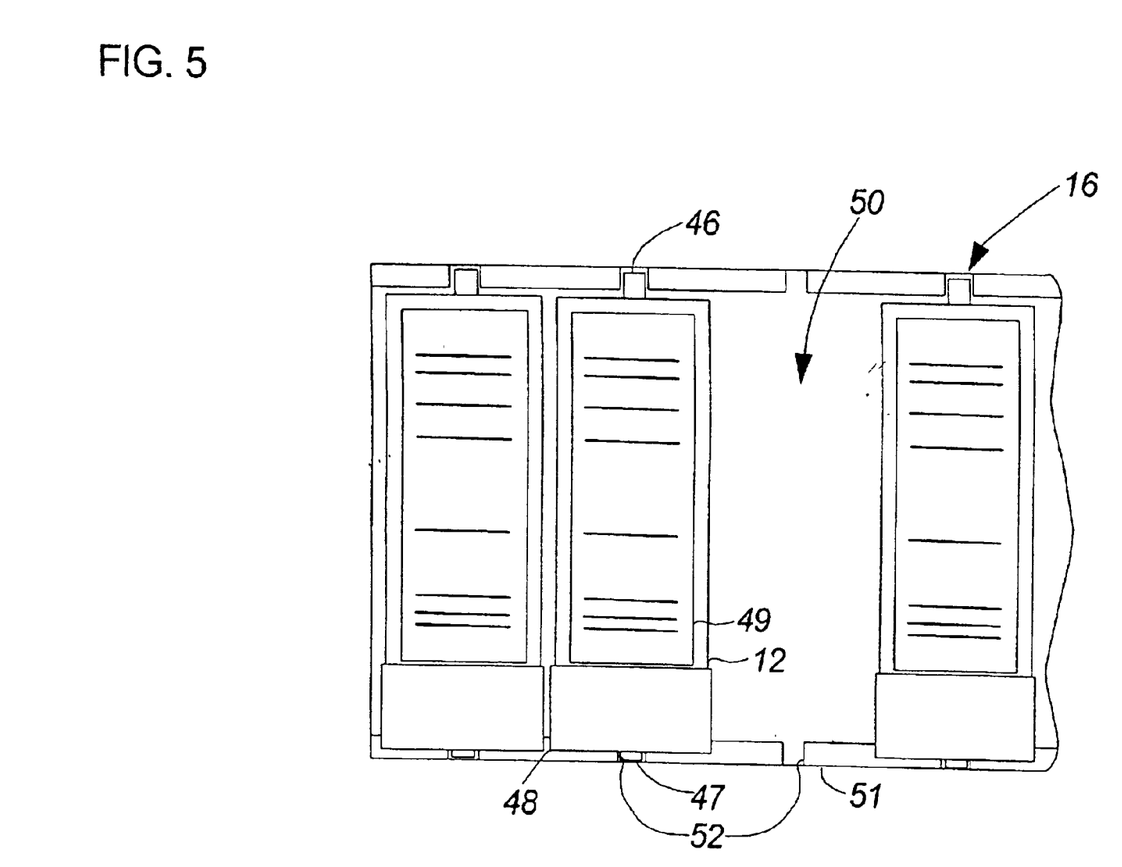
FIG. 5 is a partial front view of one embodiment of a storage magazine.

An embodiment of the storage device 16 is shown in FIG. 5, wherein the storage device is a storage magazine. According to such an embodiment, the storage device 16 may comprise a housing 51 having a number of storage chambers 50 formed therein, each sized to receive at least one of the hard disk drives 12. In one preferred embodiment, the storage device 16 is removable from the library 14. According to such an embodiment, one of the storage devices 16 may be readily removed and replaced with another storage device 16.

As noted above, the storage device 16 may comprise guides 52 that cooperate with the guide members 46, 47 to align the hard disk drives 12 therein. In one example, the guides 52 may comprise recesses or channels that are formed in the housing 51. Alternatively, the guides 52 may comprise a rail (e.g., a cylinder or rod). Of course, the guides 52 may be any suitable shape so as to cooperate with the guide member 46, 47 mounted to the hard disk drives 12. In any event, the guide members 46, 47 readily slide along the guides 52 to guide the hard disk drive 12 into the storage chamber 50 formed therein.

The guide members 46, 47 may be mounted in any suitable position on the hard disk drive 12. For example, the guide members 46, 47 may be provided on the sides of the hard disk drive 12. In such an embodiment, the mating guides 52, 56 may be provided on the sidewalls or partitions in the storage device 16 and the data-access device 18.

Although the guide members 46, 47 are preferably made of a stiff material (e.g., a hard plastic or metal), the guide members 46, 47 may be manufactured from any suitable material. In addition, the guide members 46, 47 may be any suitable shape. For example, the guide members 46, 47 may be "fins" or "blades", such as those shown in FIG. 4(a) through FIG. 4(c). However, other embodiments are also contemplated as being within the scope of the invention, as will become apparent to one skilled in the art after having become familiar with the teachings of the present invention. For example, in other embodiments the guide members 46, 47 may be substantially "T-shaped", or may form circular openings that cooperate with cylindrical guides in the storage devices 16 and the data-access device 18.

The hard disk drive 12 may also comprise a connector 22 mounted to the housing 44, as shown in FIG. 4(a) through FIG. 4(b). The connector 22 provides a link from the hard disk drive 12 to the data-access device 18 (e.g., mating connector 20, FIG. 6). The connectors 20 on the data-access device 18 may be linked to a controller 19 or directly to the user's computer (e.g., over a network). Accordingly, the hard disk drive 12 may be linked to the user's computer when the hard disk drive 12 is connected to the data-access device 18. Accordingly, the hard disk drive 12 may be linked to the user's computer when the hard disk drive 12 is connected to the data-access device 18.

The connector 22 may be any suitable connector. In one embodiment, the connector 22 may comprise multiple connections or pins, including pins for data transfer, power, and ground. In addition, the connector 22 may be a "hot swappable" connector so that the hard disk drive 12 can be readily connected without having to power down the data-access device 18. For example, the connector 22 may be a readily-available single connector attachment (SCA) such as those used in RAID storage systems. SCA connectors provide the conventional 68-pin data connection, 4-pin power connection, and configuration jumpers on a single 80-pin connector. However, it is understood that other embodiments of the connector 22 are also contemplated as being within the scope of the invention.

The hard disk drive 12 may also comprise a bracket member 48 mounted to (or integrally formed as part of) the housing 44. The bracket member 48 cooperates with the thumb assembly 38 on the picker assembly 28 so that the thumb assembly 38 engages the bracket member to withdraw the hard disk drive 12 from the data-access device 18 and the storage device 16. However, other embodiments are also contemplated as being within the scope of the present invention. For example, the bracket member 48 may instead be a notch formed in the housing 44 of the hard disk drive 12 that cooperates with the thumb assembly 38 on the picker assembly 28. Where the picker assembly 28 comprises an alternative retrieval mechanism, a suitable alternative to the bracket member 48 may also be provided to cooperate therewith.

Optionally, the hard disk drive 12 may be provided with machine-readable indicia 49 (e.g., a bar code label). It is understood that the machine-readable indicia 49 may comprise any suitable indicia, and is not limited to the bar code label shown and described herein. For example, the machine-readable indicia 49 may comprise a transponder. In any event, the machine-readable indicia 49 may be read with a suitable reader and control circuitry and used to identify the data cartridges 12 in the library 14. For example, where the machine-readable indicia 49 is a bar code label, a bar code scanner may be provided on the picker assembly 28 so that the bar code labels can be read from the hard disk drives 12 as the picker assembly 28 is moved along the displacement path 26 in the library 14. Alternatively, where the machine-readable indicia is a transponder, inductive readers may be provided adjacent the transponder in each the storage devices 16 and in the data-access device 18 to activate and read the information from the transponder.

Figure 6:
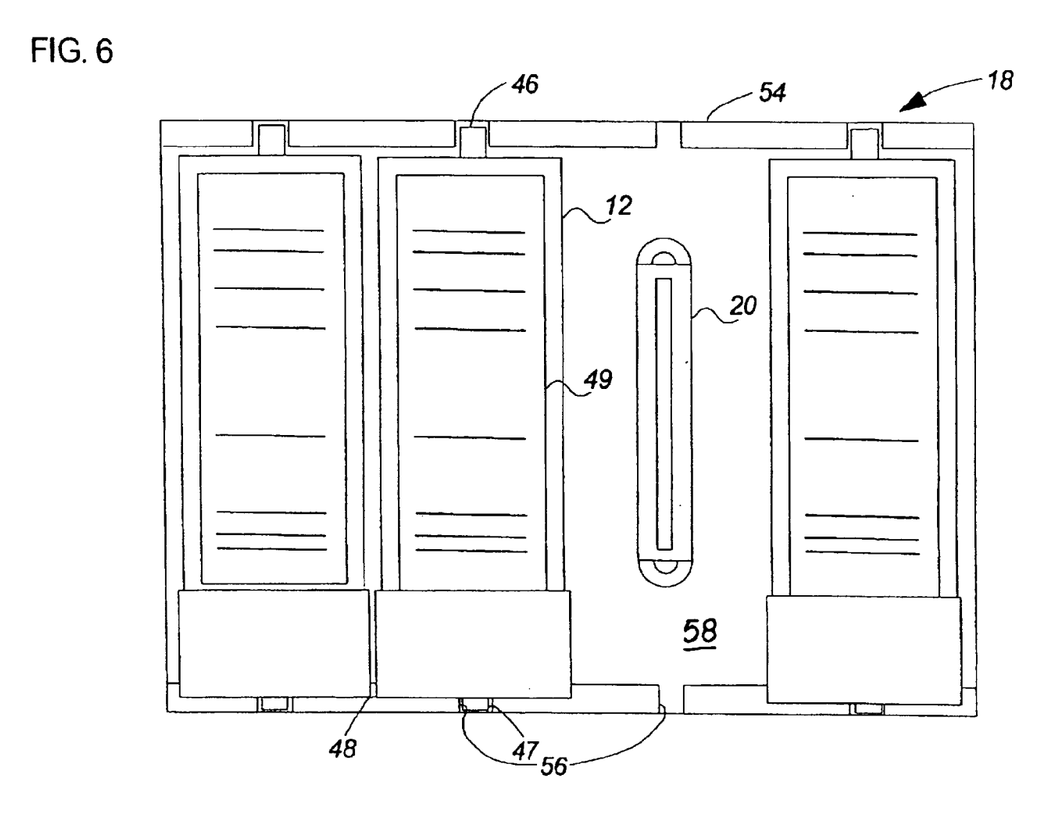
FIG. 6 is a front view of one embodiment of a data-access device.

An embodiment of the data-access device 18 is shown in more detail in FIG. 6. The data-access device 18 may comprise a backplane 58 having one or more connectors 20 mounted thereto. The number of connectors 20 mounted on the backplane may vary according to design considerations. For example, more connectors 20 provided on the backplane 58 allow more hard disk drives 12 to be simultaneously accessed.

The connectors 20 are each linked to a power source (not shown) which provides electrical power to the hard disk drive 12 when it is linked to the connector 20 at the data-access device 18. The connectors 20 also provide a data transfer connection (e.g., through control circuitry 19) that can be used to perform the read/write operations requested by the user(s).

The data-access device 18 may also comprise a housing 54. The housing 54 may be manufactured similarly to the housing 46 of the storage device 16. Indeed, in some embodiments the data-access device 18 may be removable from the library 14 (e.g., so that it can be easily replaced).

The guides 56 function similarly to the guides 52 in the storage devices 16 to align the hard disk drive 12 when it is inserted therein. In addition, the guides 56 align the connector 22 on the hard disk drive 12 with the connector 20 mounted on the backplane 58 of the data-access device 18 so that the connectors 20, 22 can be linked to one another. Again, the guides 56 may be any suitable shape to cooperate with the guide member 46, 47 on the hard disk drives 12.

The hard disk drive storage system 10 may be operated as follows, according to one embodiment of the invention. When a user connected to the hard disk drive storage system 10 (e.g., via a networked computer) requests a read/write operation, the controller (not shown) signals the picker assembly 28 to retrieve one of the hard disk drives 12 from one of the storage devices 16.

Figure 7:
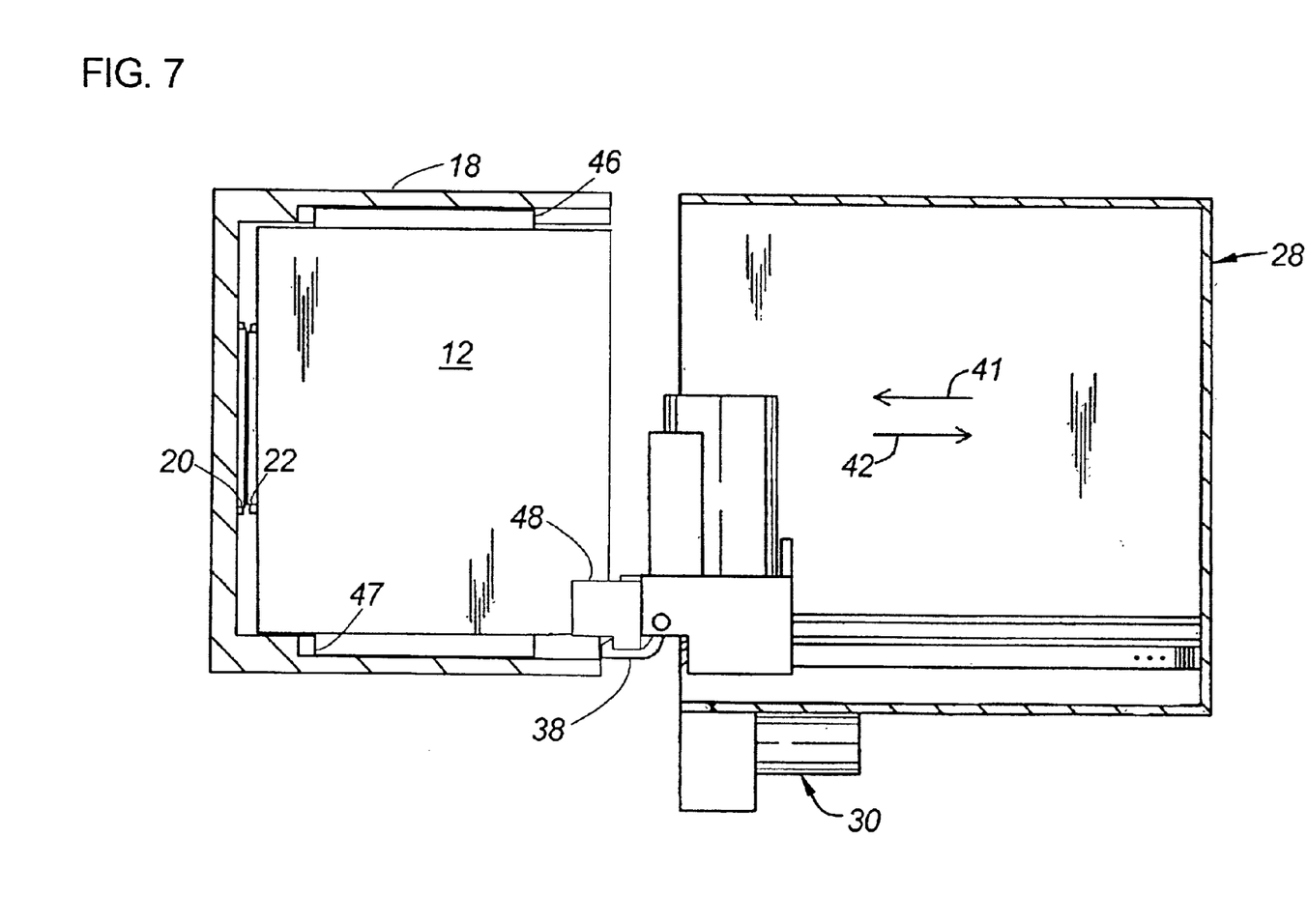
FIG. 7 is a simplified, side elevation of a picker assembly adjacent a hard disk drive illustrating operation of the picker assembly according to one embodiment of the invention.

The picker assembly 28 is moved along the displacement path 26 on the positioning rail 24 so that it is adjacent the selected data cartridge 12 in the storage device 16. Although a data-access device 18 is shown in FIG. 7, the operation of the picker assembly 28 to retrieve one of the hard disk drives 12 from the storage device 16 is similar for purposes of illustration. Once the picker assembly 28 is properly positioned in the library 14, the plunge mechanism 38 is moved in the direction of arrow 41 until it engages the hard disk drive 12. The arrangement of the plunge mechanism 38 is such that it engages the bracket member 48 on the hard disk drive 12 when the plunge mechanism 38 is at or near its fully-extended position.

After the hard disk drive 12 has been engaged by the plunge mechanism 38, the plunge mechanism 38 reverses direction, generally as shown by arrow 42 in FIG. 7. Accordingly, the engaged hard disk drive 12 is withdrawn from the storage device 16 and is received in the cartridge-receiving cavity 36 defined by the housing 40 of the picker assembly 28. The plunge mechanism 38 continues to retract until the hard disk drive 12 is received within the cartridge-receiving cavity 36 of the picker assembly 28 by an amount sufficient to allow the picker assembly 28 to move to another location in the library 14.

Once the hard disk drive 12 has been retrieved, the picker assembly 28 is moved to the data-access device 18. The picker assembly 28 then ejects the hard disk drive 12 by moving the plunge mechanism 38 in the direction of arrow 41, as shown in FIG. 7. The guide members 46, 48 on the hard disk drive 12 cooperate with the guides 56 formed in the data-access device 18 to align the hard disk drive 12 therein. The plunge mechanism 38 continues to move in the direction of arrow 41 as the connector 22 on the hard disk drive 12 contacts the connector 20 on the backplane 58 of the data-access device 18 and then links thereto (e.g., by pressing together) so that the hard disk drive 12 is ready for the read/write operation.

During the read/write operation, the picker assembly 28 may be used to retrieve and/or return other hard disk drives 12 in the storage system 10. Following the read/write operation, the picker assembly 28 may be returned to the data-access device 18 and positioned adjacent the hard disk drive 12 (i.e., when it has been moved elsewhere in the library 14). The picker assembly 28 may then be operated to engage the hard disk drive 12 from the data-access device 18, as previously described. As the hard disk drive 12 is being withdrawn from the data-access device 18, the connectors 20, 22 disengage from one another. The plunge mechanism 38 continues to retract until the hard disk drive 12 is received within the cartridge-receiving cavity 36 of the picker assembly 28 by an amount sufficient to allow the picker assembly 28 to move to another location in the library 14. The picker assembly 28 may then be operated to return the hard disk drive 12 to the storage device 16.

It is readily apparent that the hard disk drives 12 for use with the hard disk drive storage system 10 of the present invention provide the users with fast access to their data. Also advantageously, the hard disk drives 12 are physically disconnected when not in use, reducing wear and tear and/or permanent damage or data loss that may occur if the hard disk drives 12 were always connected. In addition, the hard disk drive storage system 10 requires less cabling than an "always-connected" system.

What is claimed is:

1. A hard disk drive storage system, comprising:
   a library;
   at least one storage device mounted in said library;
   at least one connector mounted in said library;
   at least one hard disk drive receivable in said at least one storage device and alternately receivable adjacent said at least one connector; and
   a picker assembly movably mounted in said library, said picker assembly delivering said at least one hard disk drive between said at least one storage device and said at least one connector, wherein said at least one storage device is removable.

2. A hard disk drive storage system, comprising:
a library;
at least one storage device mounted in said library;
at least one connector mounted in said library;
at least one hard disk drive receivable in said at least one storage device and alternately receivable adjacent said at least one connector; and
a picker assembly movably mounted in said library, said picker assembly delivering said at least one hard disk drive between said at least one storage device and said at least one connector,
wherein said at least one storage device comprises a storage magazine defining a plurality of storage chambers sized to receive said at least one hard disk drive.

3. A hard disk drive storage system, comprising:
a library;
at least one storage device mounted in said library;
at least one connector mounted in said library;
at least one hard disk drive receivable in said at least one storage device and alternately receivable adjacent said at least one connector;
a picker assembly movably mounted in said library, said picker assembly delivering said at least one hard disk drive between said at least one storage device and said at least one connector; and
at least one guide member mounted to each of said at least one hard disk drive.

4. The storage system of claim 3, wherein said picker assembly is operable to connect a mating connector of said hard disk drive to said at least one connector.

5. The storage system of claim 3, wherein said picker assembly is operable to disconnect a mating connector of said hard disk drive from said at least one connector.

6. The storage system of claim 3, further comprising a guide system mounted in said library adjacent said at least one storage device, said guide system defining a displacement path for said picker assembly in said library.

7. The storage system of claim 3, wherein said picker assembly further comprises a thumb assembly slidably mounted thereto, said thumb assembly operable to engage and disengage each one of said at least one hard disk drive.

8. The storage system of claim 3, further comprising control circuitry operatively associated with said at least one connector.

9. The storage system of claim 3, further comprising a data-access device having said at least one connector mounted thereto.

10. The storage system of claim 3, further comprising a storage device guide, said at least one guide member cooperating with said storage device guide to align said hard disk drive in said at least one storage device.

11. The storage system of claim 3, further comprising a connector guide, said at least one guide member mounted to said at least one hard disk drive cooperating with said connector guide to align said at least one hard disk drive with said at least one connector.

12. A hard disk drive storage system, comprising:
a library;
at least one storage device mounted in said library;
at least one connector mounted in said library;
at least one hard disk drive receivable in said at least one storage device and alternately receivable adjacent said at least one connector; and
a picker assembly movably mounted in said library, said picker assembly delivering said at least one hard disk drive between said at least one storage device and said at least one connector,
wherein said at least one hard disk drive has a mating connector,
wherein said mating connector and said at least one connector each comprise hot-swappable connectors,
wherein said hot-swappable connectors are single connector-attachment (SCA) connectors.

13. A hard disk drive storage system, comprising:
a library;
at least one storage device mounted in said library;
at least one connector mounted in said library;
at least one hard disk drive receivable in said at least one storage device and alternately receivable adjacent said at least one connector;
a picker assembly movably mounted in said library, said picker assembly delivering said at least one hard disk drive between said at least one storage device and said at least one connector; and
a bracket member mounted to said hard disk drive, said bracket member engaged by said picker assembly to withdraw said hard disk drive from said at least one storage device.

14. A method for accessing data from a plurality of hard disk drives in a storage system, comprising:
storing the plurality of hard disk drives in a storage device in the storage system, wherein the storage device has at least one storage device guide;
retrieving one of the plurality of hard disk drives from the storage device, the one of the plurality of hard disk drives having a guide member cooperating with the storage device guide for aligning the one hard disk drive in the storage device;
transporting the one of the plurality of hard disk drives to a connector in the storage system;
connecting the transported hard disk drive to the connector for a read/write operation; and
disconnecting the connected hard disk drive from the connector following the read/write operation.

15. The method of claim 14, further comprising returning the disconnected hard disk drive to the storage device in the storage system following the read/write operation.

16. The method of claim 14, further comprising aligning the transported hard disk drive with the connector before connecting the transported hard disk drive to the connector.

17. The method of claim 14, further comprising providing electrical power to the transported hard disk drive after connecting the transported hard disk drive to the connector.

18. The method of claim 14, further comprising providing a data connection to the transported hard disk drive after connecting the transported hard disk drive to the connector.

19. The method of claim 14, further comprising removing the storage device from the storage system and placing another storage device into the storage system.

20. The method of claim 14, wherein the one of the plurality of hard disk drives has a bracket, wherein retrieving the one hard disk drive comprises using a picker assembly to engage the bracket to withdraw the one hard disk drive from the storage device.

21. A hard disk drive storage system, comprising:
storage means for storing at least one hard disk drive in a library, the at least one hard disk drive having a bracket member;

first connecting means provided in said library for providing access to data stored on said at least one hard disk drive;

second connecting means provided on said at least one hard disk drive for matably linking said at least one hard disk drive to said first connecting means; and transport means operatively associated with said library for delivering said at least one hard disk drive from said storage means to said first connecting means and assisting connection of said first and second connecting means for a read/write operations, wherein the transport means includes a picker assembly to engage the bracket member to withdraw the at least one hard disk drive from the storage means.

22. The storage system of claim 21, wherein said transport means disconnects said first and second connecting means and returns said hard disk drive to said storage means following the read/write operation.

23. The storage system of claim 21, further comprising control means for moving said transport means in said library.

24. The hard disk drive storage system of claim 21, wherein the storage means has a storage guide, and the at least one hard disk drive has a guide member to cooperate with the storage guide for aligning the at least one hard disk drive in the storage means.

* * * * *

UNITED STATES PATENT AND TRADEMARK OFFICE
CERTIFICATE OF CORRECTION

PATENT NO. : 6,909,570 B2  Page 1 of 1
APPLICATION NO. : 10/303415
DATED : June 21, 2005
INVENTOR(S) : Curtis C. Ballard

It is certified that error appears in the above-identified patent and that said Letters Patent is hereby corrected as shown below:

In column 4, lines 40-42, delete "Accordingly, the hard disk drive 12 may be linked to the user's computer when the hard disk drive 12 is connected to the data-access device 18.".

In column 9, line 11, in Claim 21, delete "operations," and insert -- operation, --, therefor.

Signed and Sealed this

Twenty-eighth Day of July, 2009

JOHN DOLL
*Acting Director of the United States Patent and Trademark Office*